United States Patent [19]
Matsuo

[11] Patent Number: 6,109,914
[45] Date of Patent: Aug. 29, 2000

[54] GAS FLOW FURNACE

[75] Inventor: Mamoru Matsuo, Yokohama, Japan

[73] Assignee: Nippon Furnace Kogyo Kabushiki Kaisha, Kanagawa, Japan

[21] Appl. No.: 09/091,700

[22] PCT Filed: Dec. 27, 1996

[86] PCT No.: PCT/JP96/03887

§ 371 Date: Jun. 24, 1998

§ 102(e) Date: Jun. 24, 1998

[87] PCT Pub. No.: WO97/24571

PCT Pub. Date: Jul. 10, 1997

[30] Foreign Application Priority Data

Dec. 28, 1995 [JP] Japan ..................... 7-343421

[51] Int. Cl.$^7$ ................................. F27D 17/00
[52] U.S. Cl. .................. 432/180; 432/179; 432/181
[58] Field of Search .................... 432/179, 180, 432/181, 72

[56] References Cited

FOREIGN PATENT DOCUMENTS 61106721  5/1996  Japan .

Primary Examiner—Teresa Walberg
Assistant Examiner—Jiping Lu
Attorney, Agent, or Firm—Notaro & Michalds P.C.

[57] ABSTRACT

The present invention relates to a gas recirculating furnace which aims to enable generation of a high-temperature strong recirculating current and comprises heat sources 3A and 3B for heating a recirculating gas outside the furnace and an out-of-furnace circulating path 4 for taking combustion gas in the inner space of the furnace 18 to the outside of the furnace and flowing it back to the inside of the furnace 18 from a different position. The out-of-furnace circulating path 4 includes: regenerative beds 5A and 5B at recirculating gas current intake and outlet openings 9A and 9B communicating with heating chambers 2; a circulating fan 6; a passage switching device 7 for selectively and alternately connecting an intake side and a discharge side of the circulating fan 6 with one of the regenerative beds 5A and 5B; and a heat removing means 8 for performing heat removal or dilution in order to change gaseity of the gas current in a section between the regenerative beds 5A and 5B, thereby forming inside the furnace 18 a high-temperature strong recirculating current 10 for periodically inverting a flow direction of the gas current by the passage switching device 7.

10 Claims, 8 Drawing Sheets (A)

(B)

GAS FLOW FURNACE

FIELD OF THE INVENTION

The present invention relates to a gas recirculating furnace. More particularly, the present invention relates to a gas recirculating furnace for forming a recirculating gas current (referred to as a strong recirculating current in this specification) whose volume is extremely larger than that of a supplied gas current by temporarily taking the recirculating gas current to the outside of a furnace and then increasing the velocity of the gas current to be returned into the furnace.

BACKGROUND OF THE INVENTION

In case of a material or a small heating target which has a very small radiation ratio such as aluminum or ceramics, it is difficult to remove heat from such a heating target even though the radiation heat is given thereto or uniformly give heat thereto, and hence this kind of target is heated based on convection heat transfer. Since the velocity of a gas current controls the heat transfer in the convection heat transfer, there has been proposed a gas recirculating furnace for forcibly recirculating a gas current in the furnace. For example, a gas recirculating furnace such as shown in FIG. 11 is used for heating the heating target. This gas recirculating furnace is of a batch type and comprises an out-of-furnace circulating path 106 which connects a combustion chamber 102 with an exhaust chamber 103 on both side walls of a furnace 101 and has a hot blast circulating fan 104 and a duct 105 between these chambers. This gas recirculating furnace forms a recirculating gas current which partially takes out combustion exhaust gas from the exhaust chamber 103 and returns it into the combustion chamber 102. In case of this gas recirculating furnace, the gas current heated by the flame in the combustion chamber 102 passes through the inside of the furnace 107 in a direction orthogonal to the direction along which the heating target is carried and flows into the exhaust chamber 103 while heating the heating target W. Further, a part of the recirculating gas current led into the exhaust chamber 103 is exhausted, and the remaining part of the same is led into a duct (circulating path) 105 to be forcibly recirculated.

In addition, as shown in FIG. 12, in case of a continuous gas recirculating furnace constituting a plurality of zones 107a, ..., 107e, a combustion chamber 102 and an exhaust chamber 103 such as shown in FIG. 11 are provided on the both side walls of the furnace body 101 although not illustrated in FIG. 12 so that the recirculating gas current crossing the inside of the furnace be formed in each zone. An exhaust opening 110 is formed to the zone 107a adjacent to an entry opening for the heating target 108 in order to collect combustion gas which is generated in the respective zones 107a, ..., 107e and used for increasing the heat of the gas current and exhaust the collected gas from one position.

However, since the energy for causing the strong recirculating current depends on a flow quantity of the gas current and a pressure, the obtainable strong recirculating current is limited in the conventional gas recirculating furnace for performing forcible recirculation while maintaining the hot blast. That is, the pressure is proportional to a square of a flow velocity, and hence the pressure must be gained in proportion to a square of a flow velocity when increasing the flow velocity. However, increasing the pressure in proportion to the square also extremely increases the power of the circulating fan 106, and the discharge pressure can not be increased, thereby limiting a quantity of recirculation. In other words, it is hard to form the large strong recirculating current. Moreover, a high-temperature hot blast is a target, a heat-resisting blade or fan shaft must be cooled down and failures may be likely to occur. Therefore, a fan which can resist the high-temperature hot blast did not exist and recirculating the high-temperature hot blast was difficult in the prior art. Thus, in the prior art gas recirculating furnace, the limit of the temperature of gas which can recirculate outside the furnace is approximately 650° C., and the heat transfer efficiency can not be improved by increasing a temperature in the furnace. Accordingly, the quantity of heat transfer can not be increased. A heating process time becomes long in the batch type gas recirculating furnace, while a length of the furnace increases in the continuous gas recirculating furnace.

When using a burner as a heat source, realizing the high flow velocity of the gas current having a relative low temperature of not more than about 650° C. may lower the temperature of the flame, and the flame may be blown out. According to the conventional gas recirculating furnace, the recirculation effect of the recirculating gas current is not enough, and reduction in size or realization of high performance of the furnace can not be achieved.

Moreover, in case of the continuous gas recirculating furnace, the end portion of the furnace is provided on the side of the entry opening 108 in order to lower the exhaust temperature as possible. Therefore, since the full quantity of combustion gas generated for increasing the heat in the respective zones 107a, ..., 107e is collected to the end portion of the furnace and exhausted from the exhaust opening 110, the temperature in any zone is influenced by other zones (the upper right side in FIG. 12) formed on the upstream side in the flow of the combustion gas and independence of the furnace temperature can not be maintained. The furnace temperature becomes high on the side of an exit opening 109 for the heating target W and low on the side of the entry opening 108 for the same, and the temperature can not be increased in the zone 107a, which requires the maximum heat, of the entry opening 108 for the heating target. That is, even if the temperature in the furnace on the side of the entry opening for the heating target, i.e., on the side of the exhaust opening 110 is increased to rapidly heighten the temperature, the gas is exhausted with the high temperature maintained, which results in waste of energy. Further, discharging the high-temperature exhaust gas in the air adversely influences the circumferential environment. The temperature on the inlet side can not be increased and it must be heightened gradually and slowly. As a result, the length of the furnace becomes large, thereby wasting fuel. Further, even if the exhaust temperature is tried to be decreased, it is still high and is not sufficiently low, deteriorating the thermal efficiency.

In addition, uniform heating is impossible on the both right and left sides of the heating target W (front and rear sides in the flow direction of the gas current) because a flow direction of the gas current is fixed. In case of the continuous gas recirculating furnace, heat transfer due to radiation between the heating targets in the adjacent zones causes a difference in temperature between the upstream and downstream sides in a direction for carrying in such heating targets. In other words, even if such heating targets are identical or they are put on the same tray, one heating target receives radiant heat from the other heating target having a high temperature on the upstream side, whereas the heating target having a low temperature on the downstream side takes heat, thereby producing a difference in temperature. Consequently, uniform heating is difficult.

An object of the present invention is to provide a gas recirculating furnace with the high heat transfer performance. It is another object of the present invention to provide a gas recirculating furnace being capable of assuring a large quantity of high-temperature recirculating current with low power. It is still another object of the present invention to provide a gas recirculating furnace which can form a gas current having a high and uniform temperature in the entire area in the furnace.

DISCLOSURE OF THE INVENTION

To this end, a gas recirculating furnace according to the present invention comprises: heating chambers which are respectively provided on both side walls of a furnace and have a heat source for heating a recirculating gas current before injected into the furnace; and an out-of-furnace circulating path which connects these heating chambers, takes the recirculating gas current in the furnace to the outside of the furnace and flows it back into the furnace. The out-of-furnace circulating path comprises: regenerative beds provided in the vicinity of an outlet and inlet opening of each heating chamber for the recirculating gas current; a circulating fan; a passage switching device for selectively and alternately connecting the intake side and the discharge side of the circulating fan to one of the regenerative beds to switch a direction of an gas current to the regenerative beds; and a heat removing means for performing heat removal or dilution in order to change gaseity of the recirculating gas current in a section between the both regenerative beds. The gas recirculating furnace according to the present invention forms in the furnace a high-temperature strong recirculating current for inverting a flow direction of the gas current by periodically switching the passage switching device.

In this case, a part of the gas current having passed through the inside of the furnace and been used for heating the heating target is taken to the out-of-furnace circulating path by a negative pressure generated by the circulating fan and gains its pressure by the circulating fan. It is then injected into the furnace again. At this time, the recirculating gas current comes to have a low temperature when the sensible heat thereof is taken by the regenerative bed on the intake side of the out-of-furnace circulating path. After gaining the pressure by the circulating fan, the low-temperature recirculating gas current passes through the regenerative bed on the opposed side and again comes to have a high temperature by direct heat exchange so that it can be injected into the furnace. Therefore, the low-temperature circulating fan can be used for forming a high-temperature strong recirculating current in the furnace. In other words, since the temperature of the recirculating gas current becomes low when recirculating through the hot blast circulating path outside the furnace, the circulating fan can be enlarged (increasing its capability), and the quantity of discharge flow can be increased to enable generation of the strong recirculating current. Since the quantity of heat transfer becomes large and the heating process can be faster as the flow velocity of the gas current is high in the convection heat transfer, it is possible to realize gas current burning of ceramics and others which was conventionally considered to be impossible because the burning temperature of not less than 1000° C. is required or realize uniform heating of a small substance.

According to the gas current furnace of the present invention, since the recirculating gas current flows at a high velocity, the quantity of recirculation can be greatly increased by the momentum in the wide area in a heating space, thereby forming the strong recirculating current to intend an increase in the quantity of heat transfer. Thus, increasing the quantity and the temperature of the recirculating gas current leads to an increase in the quantity of convection heat transfer, which enables reduction in size of the furnace or in heating process time.

Further, according to the gas recirculating furnace of the present invention, since the direction of the gas current is periodically inverted, uniformalization of the temperature in the furnace reduces a difference in temperature in the furnace, and the heat stress to the furnace structure can be minimized while the heating target can be uniformly heated. In addition, periodic inversion of the flow direction of the high-temperature strong recirculating gas current further uniforms the temperature distribution in the furnace, thus reducing the unevenness in heating the target substance.

On the other hand, in the out-of-furnace circulating path, heat removal or dilution performed by the heat removing means changes gaseity of the recirculating gas current, which prevents the balanced temperature from being increased. Here, the balanced temperature and the temperature at the return opening obtained by removing heat of the recirculating gas current can be represented by the following expression (1).

Balanced Temperature Obtained by Removing Heat from the Recirculating Gas Current $$t_c = t_h - \frac{\Delta t}{1 - \eta_t} \qquad (1)$$

$$t_1 = (1 - \eta_t)t_c + \eta_t t_h$$

$t_c$: balanced temperature ° C.

$t_h$: temperature of recirculating gas current (at output opening) ° C.

$t_1$: temperature of recirculating gas current (at return opening) ° C.

$\Delta t$: difference in temperature obtained by removing heat of recirculating gas current ° C.

$\eta_t$: temperature efficiency of regenerator

The balanced temperature $t_c$ of the gas current at an inlet opening of the circulating fan is dominated by a difference in temperature $\Delta t$ obtained by removing heat of the recirculating gas current and the temperature efficiency of the regenerative bed and, for example, when the temperature $t_h$ of the recirculating gas current at the output opening is 1000° C., the relationship shown in FIG. 5 is established. In addition, a balanced temperature and a temperature at the return opening obtained by diluting the recirculating gas current are represented by the following expression 2.

Balanced Temperature Obtained by Diluting the Recirculating Gas Current $$t_c = \frac{t_h - \left(1 + \frac{\Delta G}{G}\right)\eta_t t_h + \frac{\Delta G}{G}t_o}{\left(1 + \frac{\Delta G}{G}\right)(1 - \eta_t)} \qquad (2)$$

$$t_1 = (1 - \eta_t)t_c + \eta_t t_h$$

$t_c$: balanced temperature ° C.

$t_h$: temperature of recirculating gas current (at output opening) ° C.

$t_i$: temperature of recirculating gas current (at return opening) ° C.

$t_o$: ambient temperature ° C.

$\Delta G$: quantity of diluted air $Nm^3/h$ $G$: quantity of recirculating gas current $Nm^3/h$ $\eta_r$: temperature efficiency of regenerative bed The balanced temperature $t_c$ of the gas current at an inlet opening of the circulating fan is controlled by the quantity of the diluted air $\Delta G$ to the recirculating gas current and the temperature efficiency of the regenerative bed and, for example, when the temperature $t_h$ of the recirculating gas current at the output opening is 1000° C. and the ambient temperature $t_o$ is 20° C., the relationship shown in FIG. 6 is established. Therefore, the gaseity can be changed by removing appropriate quantity of heat or diluting the appropriate quantity of air in the out-of-furnace circulating path to prevent the balanced temperature from increasing.

Here, although the above-mentioned heat removing means is not restricted to be set at a given position as long as it is provided between the regenerative beds set at the recirculating gas current intake and outlet openings of the heating chambers in the vicinity of the out-of-furnace circulating path, it may be preferably placed between the passage switching means and the intake side of the circulating fan. In such a case, the recirculating gas current flowing into the circulating fan comes to have a further lower temperature, which reduces damages to the circulating fan and increases the quantity of the recirculating current. Additionally, the heat removing means is constituted by injecting a small quantity of gas for dilution such as air or exhaust gas into the recirculating gas current, e.g., using a heat exchange or a material preheating section of the heating equipment, or by reducing the heat retaining effect of the passage between the both regenerative beds, e.g., reducing the thickness of the heat insulator or using the heat insulator having a poor heat retaining property.

Moreover, various kinds of burner, radiant tube burner, electric heater can be used as a heat source in the gas recirculating furnace, and it is preferable to employ a burner, particularly a regenerative burner system which is provided with regenerative beds and alternately burns a pair of burners that supply combustion air or exhaust recirculating gas current through the regenerative beds. In this case, when partially exhausting the recirculating gas having been used for heating the heating target, since the recirculating gas is again used for preheating the combustion air with the extremely high thermal efficiency and returned to the furnace after its sensible heat is recovered in the regenerative bed, the heat of the recirculating gas current can be recovered so that this gas current be cooled down to have a low temperature which does not give the adverse influence on the environment and then exhausted even though a temperature of the recirculating gas current is increased, thereby maintaining the high thermal efficiency.

The gas recirculating furnace according to the present invention is a continuous gas recirculating furnace partitioned into a plurality of zones in a direction along which a heating target is carried, and the heating chamber and the out-of-furnace circulating path are provided for each zone so that the high-temperature strong recirculating current for periodically inverting a flow direction of the gas current be formed in each zone. In this case, independently forming the recirculating gas current in each zone recirculates the heat, which does not adversely affect the gas current temperature in any other zone. The temperature or the recirculating quantity of the recirculating gas current can be set for each zone in accordance with material of a heating target and other elements in each zone in order to give an appropriate quantity of heat. Rationalization such as reduction in size of the furnace and energy saving can be simultaneously realized while optimizing heat transfer. Additionally, since the high-temperature strong recirculating gas current is formed in each zone, the quantity of heat transfer can be increased while maintaining independence of the furnace temperature. In particular, when the gas current temperature in a zone in the vicinity of the heating target entry opening is higher than that in the vicinity of the heating target exit opening, the temperature in a zone in the vicinity of the heating target entry opening which needs the maximum heat is increased to speed up an increase in temperature of the heating target. Thus, the length of the heating furnace can be prominently shortened in cooperation with an increase in temperature of the recirculating gas current, thereby greatly reducing the heating equipment cost.

Moreover, it is preferable to provide partition plates before and behind a tray for carrying the heating target in order to intercept radiation heat from the heating target on another tray in the forward direction and intercept radiation heat from the heating target on still another tray in the backward direction. In this case, heat transfer caused due to radiation between the heating targets in adjacent zones with the tray partitioning plate therebetween can be prevented and independence of the zones can be maintained. Accordingly, a difference in temperature between the front and rear of the heating target or between the front and rear heating targets on the same tray can be prevented from being generated, and a gas current temperature can be set in accordance with each zone.

BEST MODES FOR EMBODYING THE INVENTION

The structure of the present invention will now be described in detail in connection with illustrative preferred embodiments.

Figure 1:
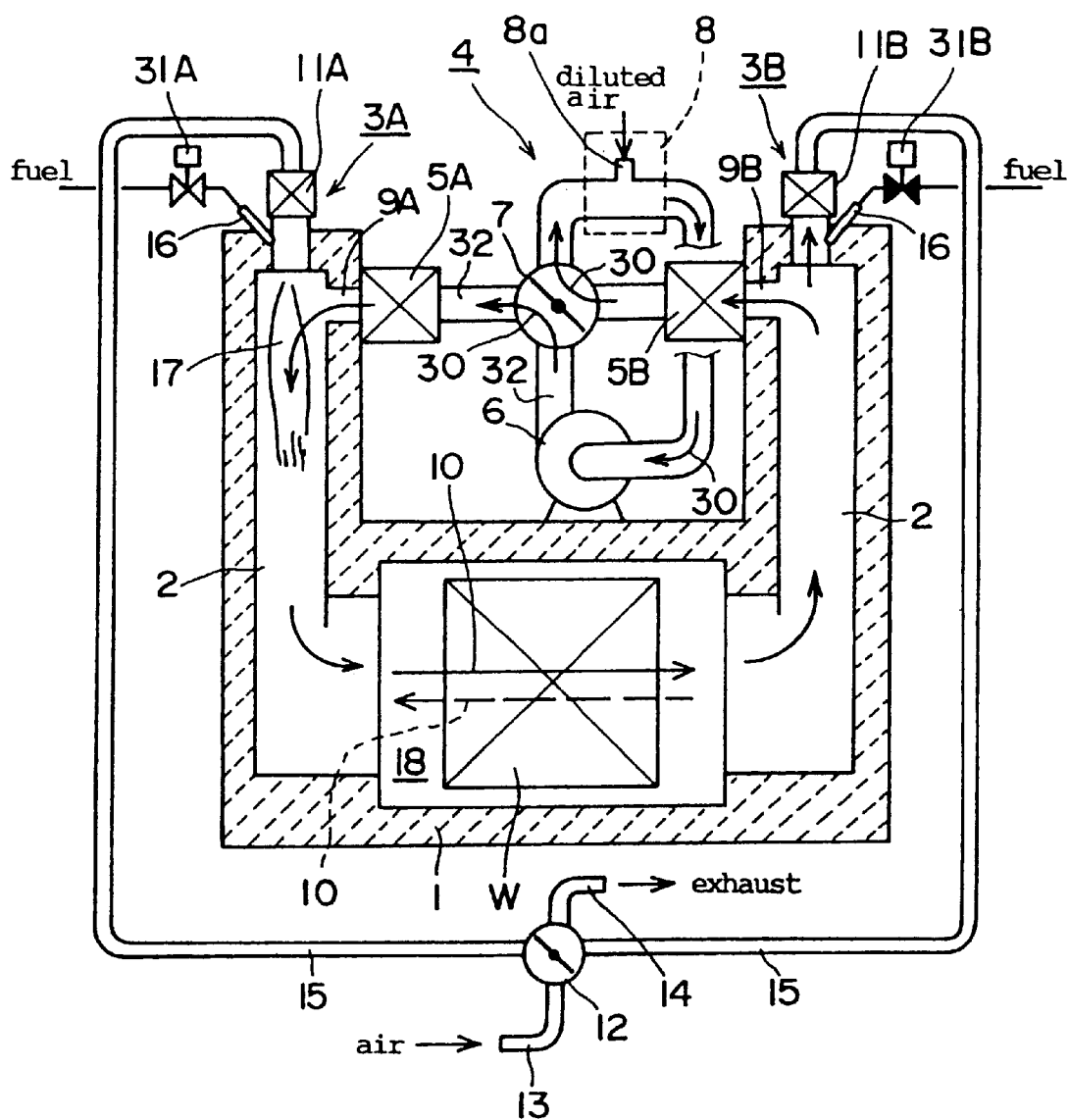
FIG. 1 is a principle view showing an embodiment of a gas recirculating furnace according to the present invention.

FIG. 1 shows an embodiment in which the present invention is applied to a batch type gas recirculating furnace. This gas recirculating furnace is mainly made up of: a furnace 1; heating chambers 2 connected with both side walls of the furnace 1; burners 3A and 3B as heat sources for heating a recirculating gas current 30 in these heating chambers 2 for increasing the heat; and an out-of-furnace circulating path 4 for passing the high-temperature gas current obtained after increasing the heat through the inside of the furnace 18, taking it out to the heating chamber 2 on the opposed side and again flowing it back into the heating chamber 2 on the injection side. As a heat source, in this embodiment, there is adopted a regenerative burner system constituted by a pair of burners 3A and 3B that alternately burn. The out-of-furnace circulating path 4 is provided so as to form in the inner space of the furnace 18 a high-temperature strong recirculating current 10 which periodically inverts a flow direction of the gas current in response to changeover of the heat source burners 3A and 3B. Recirculating gas current outlet and inlet openings 9A and 9B of the out-of-furnace circulating path 4 are positioned in the upper parts of the heating chambers 2. The recirculating gas current injected from the out-of-furnace circulating path 4 is heated to a predetermined temperature in the heating chambers 2 and then injected into the inside of the furnace 18. The recirculating gas current 30 forms a high-temperature strong recirculating current 10 which passes through the inside of the furnace 18 in a direction orthogonal to a heating target W carrying direction via the both combustion chambers 2 and the out-of-furnace circulating path 4.

On the other hand, the regenerative burner system selectively and alternately connects the pair of burners 3A and 3B respectively having regenerative beds 11A and 11B to an air supply system 13 or an exhaust system 14 through a passage switching means 12, and exhausts the combustion gas which has been used for heating the heating target W from one of the two burners 3A and 3B which is not performing combustion while burning the other burner. The respective burners 3A and 3B are disposed to tops of the heating chambers 2 provided on, e.g., the both side walls of the furnace 1 and alternately operate. It is to be noted that reference numeral 16 in the drawing denotes a fuel nozzle.

The regenerative beds 11A and 11B are accommodated in burner bodies or casings different from the burner bodies and incorporated in the burners 3A and 3B. The regenerative beds 11A and 11B perform heat exchange with the exhaust gas passing therethrough to recover the wasted heat and preheat the combustion air by using the recovered heat. The regenerative beds 11A and 11B of the respective burners 3A and 3B are connected to two out of four ports (two ports placed at positions where they are not connected with each other) of a four-way valve 12 through ducts 15. Further, the air supply system 13 and the exhaust system 14 are respectively connected to the remaining two ports of the four-way valve 12. Therefore, as to the respective burners 3A and 3B and the regenerative beds 11A and 11B, one pair of burner and regenerative bed are connected with the air supply system 13 while the remaining pair of burner and regenerative bed are connected with the exhaust system 14. Their connection is switched by changeover of the four-way valve 12.

On the other hand, the out-of-furnace circulating path 4 is constituted by: regenerative beds 5A and 5B provided in the vicinity of the recirculating gas current outlet and inlet openings 9A and 9B of the respective heating chambers 2; a circulating fan 6; a passage switching device 7 which selectively and alternately connects the intake side and the discharge side of the circulating fan 6 to one of the regenerative beds 5A and 5B to switch a flow direction of the gas current to the regenerative beds 5A and 5B; a heat removing means 8 for performing heat removal or dilution to change gaseity of the gas current; and a duct 32 for connecting the aforesaid members. The periodical changeover of the passage switching apparatus 7 alternately carries out removal and re-supply of a part of combustion gas which has passed through the regenerative beds 5A and 5B, and forms the high-temperature strong recirculating current 10 which periodically inverts a flow direction of the gas current in the furnace 18.

Here, it is preferable to use the structure and material whose pressure loss is relatively low but heat capacity is large and which have the improved durability, e.g., a ceramic cylindrical body which has a plurality of cells and a honey-comb shape for the regenerative beds 11A and 11B used for the heat source burners 3A and 3B as well as the regenerative beds 5A and 5B provided in the out-of-furnace circulating path 4. For example, a honey-comb-shaped member manufactured by extrusion-molding the ceramic material such as cordierite or mullite may be preferably used for heat exchange between a fluid having a high temperature of approximately 1000° C. such as the combustion exhaust gas and a counterpart having a relatively-low temperature of approximately 20° C. such as the combustion air. Further, as a honey-comb-shaped regenerative bed, it may be possible to employ a material other than cordierite or mullite or a material other than aluminum or ceramics, e.g., a metal such as a heat-resisting steel or a complex of ceramics and a metal, e.g., an $Al_2O_3$—Al complex or an SiC—$Al_2O_3$—Al complex whose pores are completely filled up. This type of complex can be manufactured by causing the melted metal to spontaneously penetrate into pores of the ceramics having a porous structure, oxidating or nitriding a part of that metal to turn into ceramics. It is to be noted that the honey-comb shape essentially indicates hexagonal cells (holes) but it includes the structure having square or triangular cells as well as hexagonal cells formed thereto in this specification. In addition, the honey-comb-shaped regenerative bed may be obtained by bundling tubes or the like without performing integral molding. However, the shapes of the regenerative beds 5A, 5B, 11A and 11B are not restricted to the honey-comb shapes, and flat-plate-type or corrugated-plate-type regenerative materials may be radially arranged in a cylindrical casing or pipe-like regenerative materials may be filled in a cylindrical casing in such a manner that the fluid can pass through the materials in the axial direction. Further, a cylindrical casing in which two chambers are formed by a partition wall in the circumferential direction and the fluid can pass in the axial direction may be prepared, and the regenerative bed may be constituted by filling a lump of the spherical, short-pipe-like, short-rod-like, small-piece-type, nugget-type or net-type regenerative material in each of the chambers.

In addition, a diluted air injection opening 8a as the heat removing means 8 is provided between the intake side of the circulating fan 6 and the passage switching device 7. The air having an ordinary temperature is injected from the diluted air injection opening 8a so that heat removal suitable for the temperature efficiency of the regenerative beds 5A and 5B can be carried out. In this case, the thermal efficiency of the entire equipment is greatly improved. The quantity of heat removal obtained by injecting the air having an ordinary temperature can be represented by the above-described expression 1.

Figure 6:
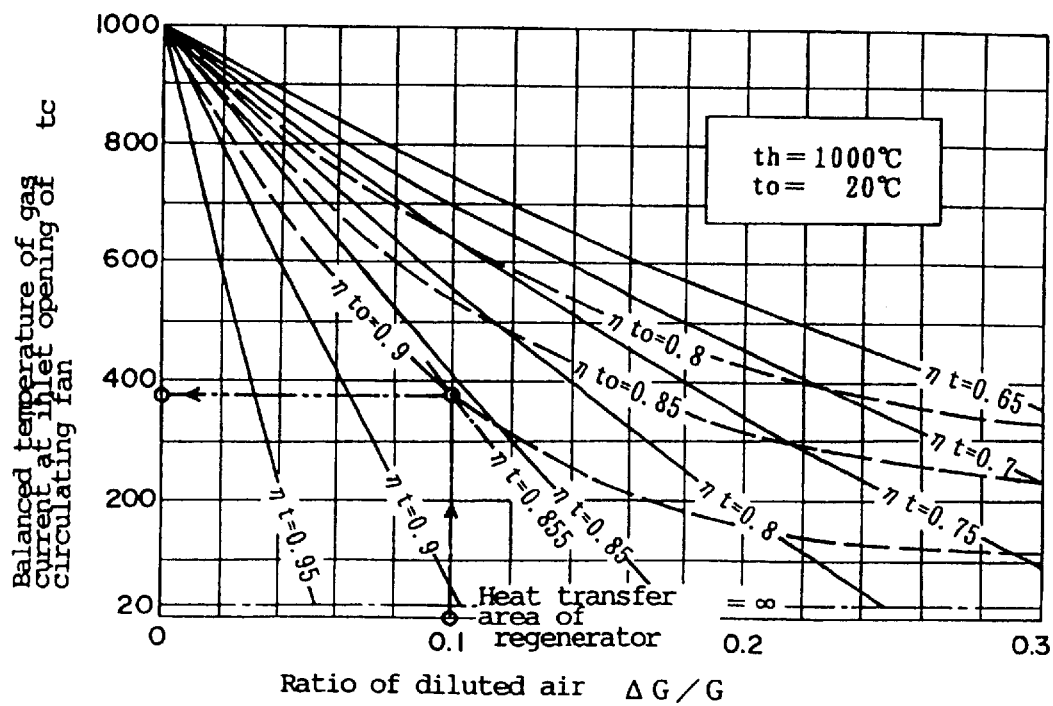
FIG. 6 is a graph showing the relationship between the balanced temperature of the gas current at the inlet opening of the circulating fan and the diluted air ratio in terms of the temperature efficiency of the regenerative bed.

The balanced temperature tc of the gas current at the intake opening of the circulating fan is controlled by the quantity of diluted air ΔG to the recirculating gas current and the temperature efficiency of the regenerative bed and, for example, the relationship shown in FIG. 6 can be established when a temperature th at the recirculating gas current output opening is 1000° C. and the ambient temperature is 20° C. In order to prevent the balanced temperature from increasing, gaseity is changed by diluting an appropriate amount of the air in the out-of-furnace circulating path 4. The dilution ratio is usually set in the range from 0.1 to 0.25 when the temperature efficiency of the regenerative beds 5A and 5B is 80 through 90%. It is assumed that the regenerator having the temperature efficiency of η to =0.9 is used with the dilution ratio ΔG/G=0 and the temperature th at the recirculating gas current output opening being 1000° C. When dilution is performed with the ratio ΔG/G=0.1, the balanced temperature tc, the temperature efficiency ←t and the recirculating gas current temperature t1 at the return opening are tc=380° C., ←t=0.855 and t1=910° C., respectively.

According to the gas recirculating furnace having the above arrangement, the high-temperature strong recirculating current can be realized in the furnace in the following manner.

The pair of regenerative burners 3A and 3B constituting the heat source alternately burn to form a flame 17 in the heating chambers 2, and the heat of the recirculating gas current moving toward the furnace is to be increased. For example, when the burner 3A is operated, the four-way valve 12 is changed over so as to connect the burner 3A with the combustion air supply system 13, and one fuel control valve 31A is opened while the other fuel control valve 31B is closed. As a result, the supplied combustion air passes through the regenerative bed 11A and is preheated to a high temperature close to the exhaust gas temperature, e.g., approximately 800 through 1000° C. Thereafter, it flows into each burner throat and is mixed with the fuel injected from each fuel nozzle 16 to be burned. On the other hand, a part of the gas which has passed through the inside of the furnace 18 (the recirculating gas current 30 and the combustion gas) is exhausted on the side of the burner 3B connected with the exhaust system. Here, the heat of the exhaust gas is recovered by the regenerative bed 11B. When a short time period, e.g., not more than 60 seconds, or more preferably a short time period of approximately 20 seconds or less lapses after the burner 3A is activated, the four-way valve 12 is changed over, and the one of the fuel control valves 31A and 31B is closed while the other is opened in response to this changeover operation. Consequently, the combustion air and the fuel are supplied to the burner 3B to start combustion, and the burner 3A enters the standby mode. At this time, the combustion air supplied to the burner 3B is preheated by the regenerative bed 11B preheated by the heat of the exhaust gas and comes to have a very high temperature (for example, approximately 800 through 1000° C.).

Usually, when the flow of the recirculating gas current 30 having a high velocity collides with the flame 17, the flame temperature is lowered to cause the flame failure. However, since the temperature of the recirculating gas current 30 (high temperature close to that of the exhaust gas) is higher than a self-ignition temperature of the fuel and the temperature is not easily decreased at the ignition point, the ignitionability and the stability of the flame are excellent and the flame does not blown out.

Thereafter, the burner 3A and the burner 3B alternately operate at predetermined time intervals in synchronism with the passage switching device 7 for the recirculating gas current 30 and repeat alternate combustion by using the combustion air having a very high temperature, thereby intending an increase in heat of the recirculating gas current 30 whose heat has been used for heating.

At the same time, the recirculating gas current 30 flowed out from the inside of the furnace 18 to the heating chamber 2 is induced to the out-of-furnace circulating path 4 by the negative pressure generated by the circulating fan 6 and gains its pressure by the circulating fan 6. It is then again injected from the heating chamber 2 to the inside of the furnace 18 at high speed to form the high-temperature strong recirculating current 10 in the inner space of the furnace 18. At this time, the recirculating gas current 30 passes through the regenerative bed 5B at the recirculating gas current outlet and inlet opening 9B of the out-of-furnace circulating path 4 and wastes its sensible heat to the regenerative bed 5B to have a low temperature. Further, the heat removing means 8 causes the recirculating gas current 30 to have a lower temperature. After the recirculating gas current 30 is led to the circulating fan 6 at the low temperature and gains its pressure, it passes through the regenerative bed 5A on the opposed side to be injected into the inner space of the furnace 18. Here, the recirculating gas current 30 again comes to have a high temperature by direct heat exchange in the regenerative bed 5A (or 5B). The high-temperature recirculating gas current 30 having a temperature of approximately 1000° C. or higher is, therefore, cooled down to have a low temperature of 200° C. or lower when passing through the out-of-furnace circulating path 4, and again comes to have the above-mentioned high temperature when returning to the inside of the furnace 18.

The high-temperature and high-speed strong recirculating current 10 can greatly increase the circulating quantity of the gas current in the wide area in the heating space. As a result, the quantity of flow of the gas passing through the inside of the furnace 18 corresponds to the sum of the quantity of the input air and fuel and the quantity of the gas in the recirculating gas current 30. An increase in the quantity of the recirculating gas current intensifies the gas flow in the inner space of the furnace 18, and acceleration of mixing the gas in the furnace or an increase in the quantity of convection heat transfer occurs, and differences in temperature in the furnace (differences in temperature of the atmospheric air at each points in the furnace) are eliminated to make the temperature distribution uniform.

Moreover, an increase in the gas recirculation ratio also increases the heat capacity of the combustion gas, thereby enlarging the quantity of heat transfer. In other words, since the velocity of the gas current controls heat transfer in the convection heat transfer, an increase in the quantity of the recirculating gas current greatly improves the heat transfer efficiency. Additionally, periodical inversion of the direction of the strong recirculating gas current 10 further uniformalizes the temperature of the gas current in the furnace to eliminate unevenness in heating. Also, although the maximum temperature in the furnace (the temperature in the furnace is an atmospheric air temperature formed by the gas current temperature and the furnace wall temperature) is lowered in inverse proportion to an increase in the gas circulation ratio, the average temperature in the furnace hardly decreases and the maximum temperature in the furnace approximates to the average temperature in the furnace so that the temperature distribution in the furnace averages.

Thus, in the gas recirculating furnace according to the present invention, an increase in the temperature caused by combustion due to an increase in heat of the recirculating gas current 30 can be suppressed to 300 through 500° C. to reduce the quantity of combustion.

Although the above has described a preferred embodiment according to the present invention, the invention is not restricted thereto, and various modifications and other embodiments are possible within the true scope and spirit of the present invention. For example, in the foregoing embodiment, description has been given as to the case where the regenerative burner system for alternately burning a pair of burners 3A and 3B having the regenerative beds 11A and 11B is adopted as a heat source, but the present invention is not restricted to this example. For instance, an electric heater, a radiant tube burner, an oxygen combustion burner or any other burner may be used as a heat source. Here, in case of the heat source which can not be switched in a short time period of several tens seconds such as an electric heater or a radiant tube burner, the heat sources of the both heating chambers 2 are always ON. In this case, the generated heat is recovered by the regenerative beds 5A and 5B of the out-of-furnace circulating path 4 and used for heating the recirculating gas current so that it can not be wasted.

Figure 2:
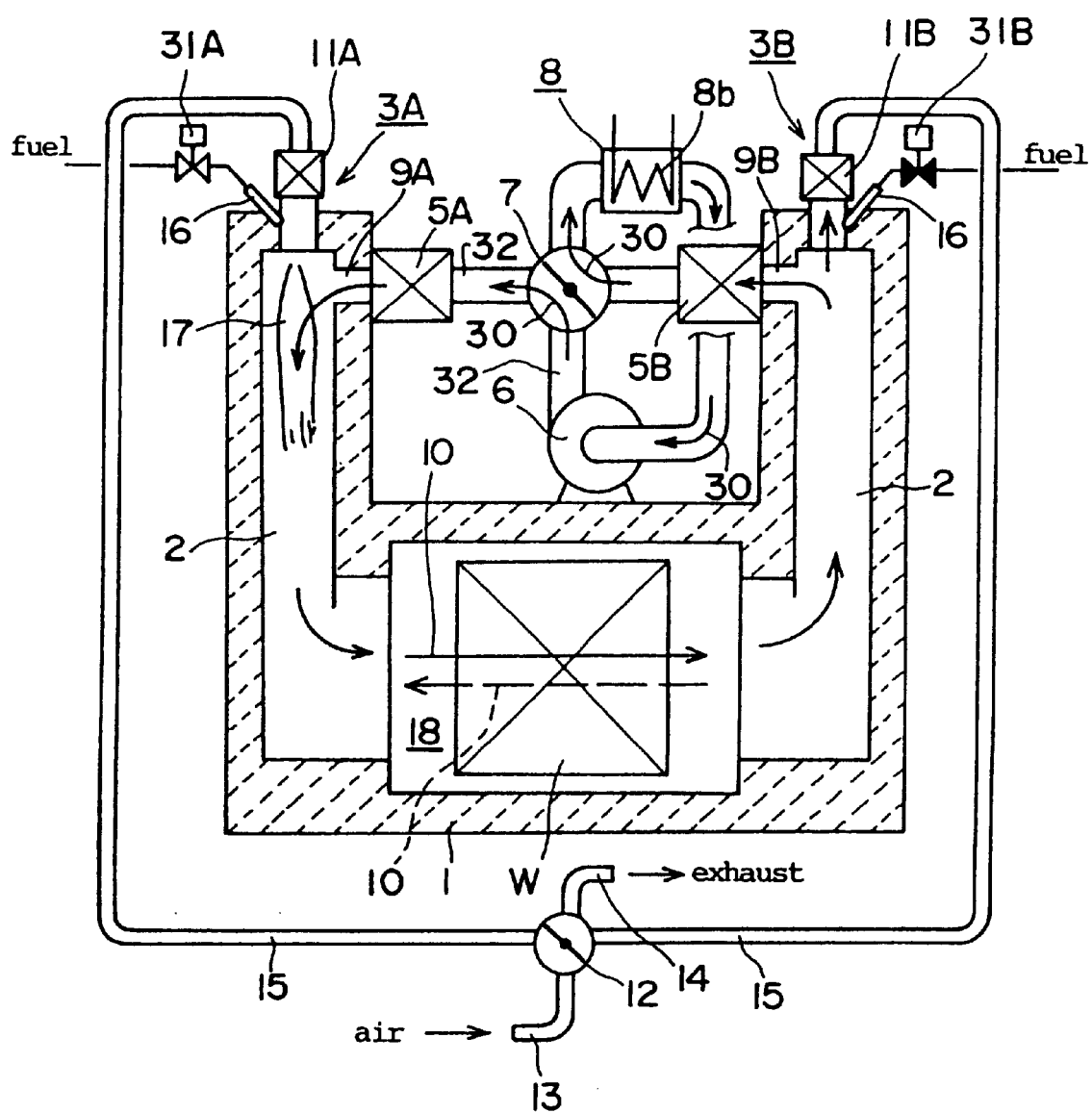
FIG. 2 is a principle view showing another embodiment of the gas recirculating furnace according to the present invention.
Figure 5:
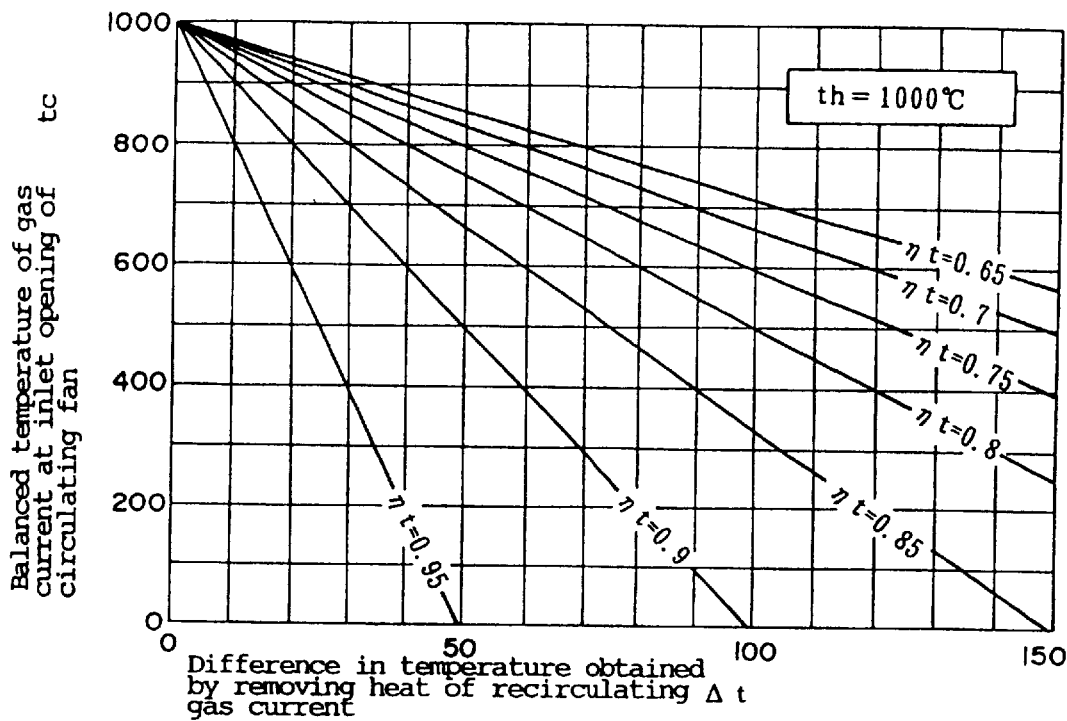
FIG. 5 is a graph showing the relationship between the balanced temperature of the gas current at an inlet opening of the circulating fan and a difference in temperature obtained by removing heat of the recirculating gas current in terms of relationship with the temperature efficiency of the regenerative bed.

The heat removing means 8 is not restricted to a specific type and, as shown in FIG. 2, a means for directly taking out the heat from the recirculating gas current may be employed. This gas recirculating furnace uses a heat exchanger 8b as the heat removing means 8. In this case, the property of the recirculating gas current is changed by heat exchange so as to establish the relationship shown by the above expression 2 and FIG. 5.

Although not shown, the heat removing means 8 can be also configured by decreasing the heat insulating effect of the passage between the both regenerative beds 5A and 5B of the out-of-furnace circulating path 4, e.g., by reducing the thickness of a heat insulating material or using an inexpensive heating insulating material having the poor heat insulating property. In such a case, although the heat utilizing efficiency is lowered, a quantity of a heat insulating material used in the facility can be reduced or use of an inexpensive heat insulating material can lead to a reduction in the facility cost.

Figure 3:
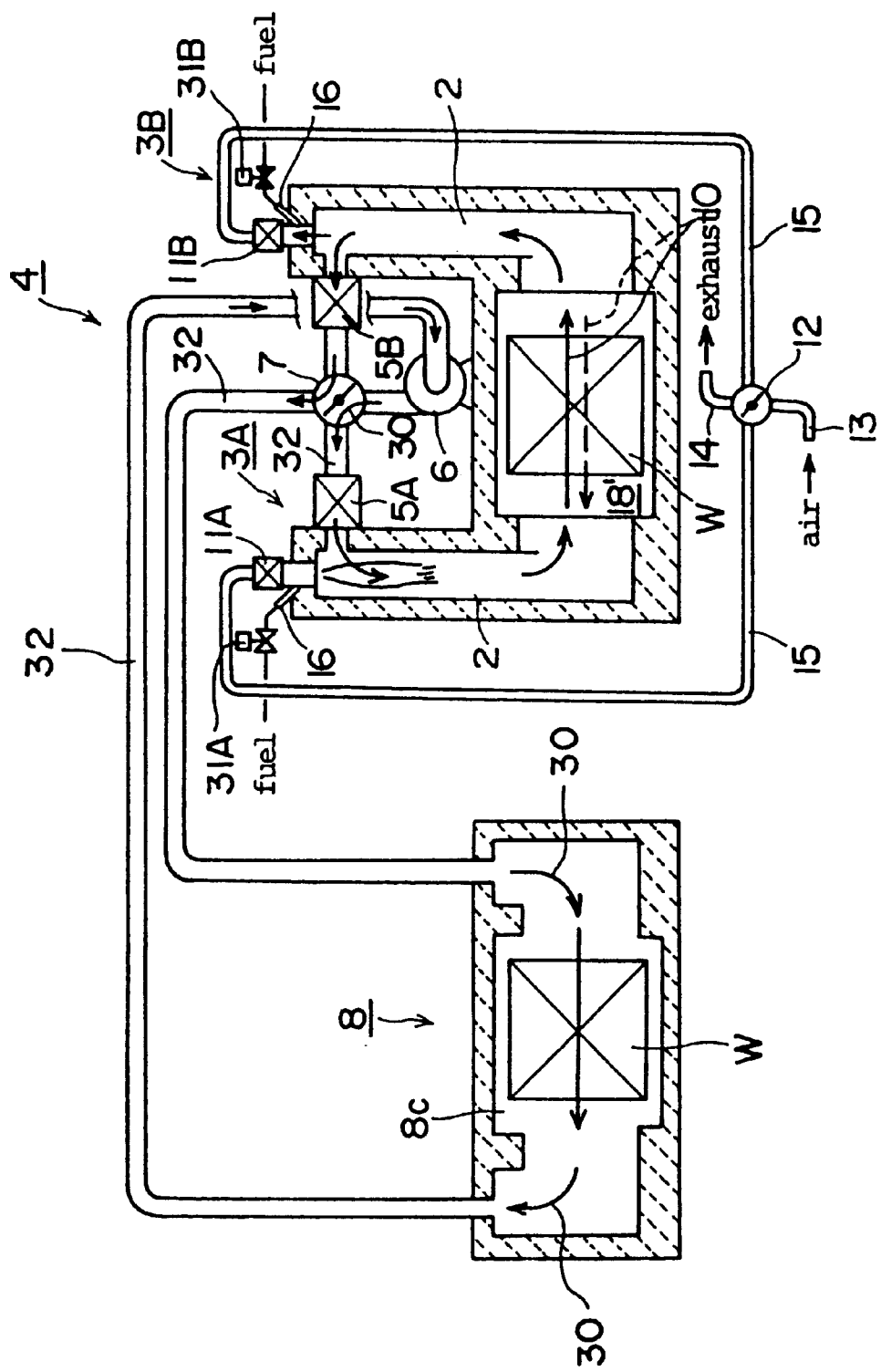
FIG. 3 is still another embodiment of the gas current furnace according to the present invention.
Figure 4:
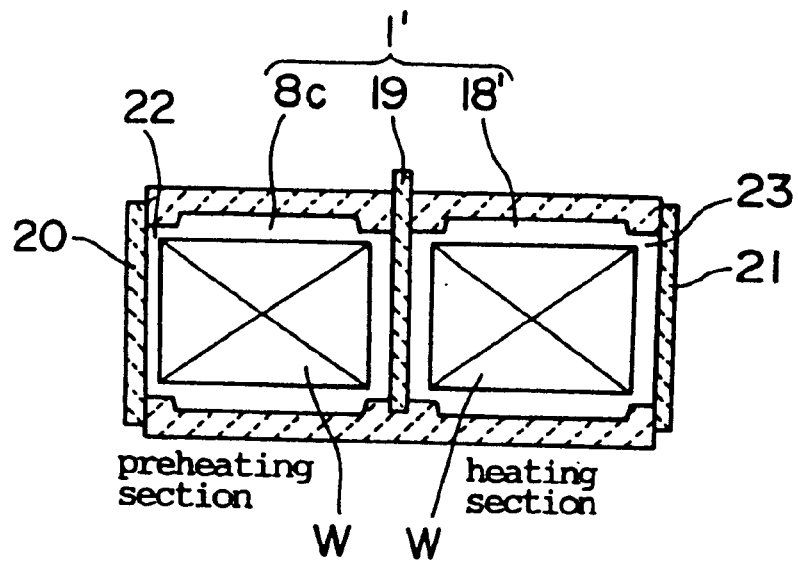
FIG. 4 is views showing vertical cross sections of the gas recirculating furnace illustrated in FIG. 3, in which (A) shows one type having a partition door and (B) shows another type having partition walls.
Figure 4:
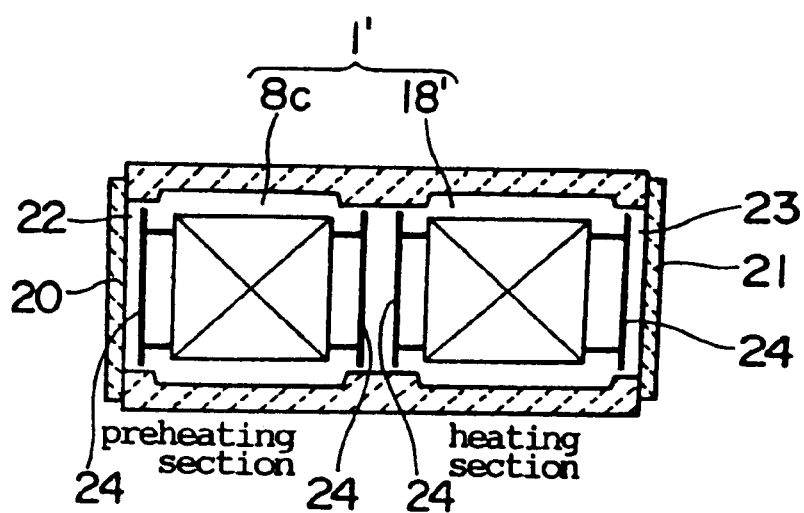

FIGS. 3 and 4 show another embodiments. The gas recirculating furnace has a preheating section 8c provided on the upstream side of a heating section 18' and uses the preheating section 8c as the heat removing means 8. In this case, a partition door 19 is provided between the heating section 18' and the preheating section 8c to form two chambers so as to prevent the recirculating gas current from directly flowing between the both chambers 18' and 8c. The preheating section 8c of the heating equipment 1' is connected between the passage switching device 7 and the circulating fan 6 to remove heat by preheating the heating target W. The heat source burner 3 and the out-of-furnace circulating path 4 are connected to the heating section 18' of the heating equipment 1' so that the strong recirculating current 10 having a high temperature be formed.

In addition, a heating target entry opening 22, an insertion door 20 for opening/closing the heating target entry opening 22, an exit opening 23, and an output door 21 for opening/closing the exit opening 23 are provided to the preheating section 8c and the heating section 18 ', respectively.

As shown in FIG. 4(B), partition plates 24 can be provided before and behind each tray on which the heating target W is mounted, and the partition plate 24 may be substituted by the partition door 19.

Figure 7:
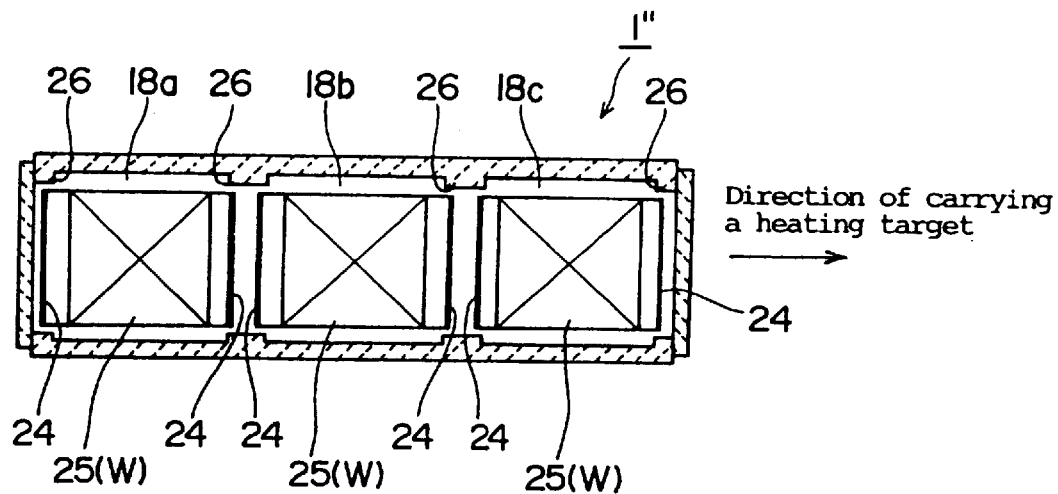
FIG. 7 is a principle view showing an embodiment in which the present invention is applied to a continuous gas recirculating furnace.
Figure 8:
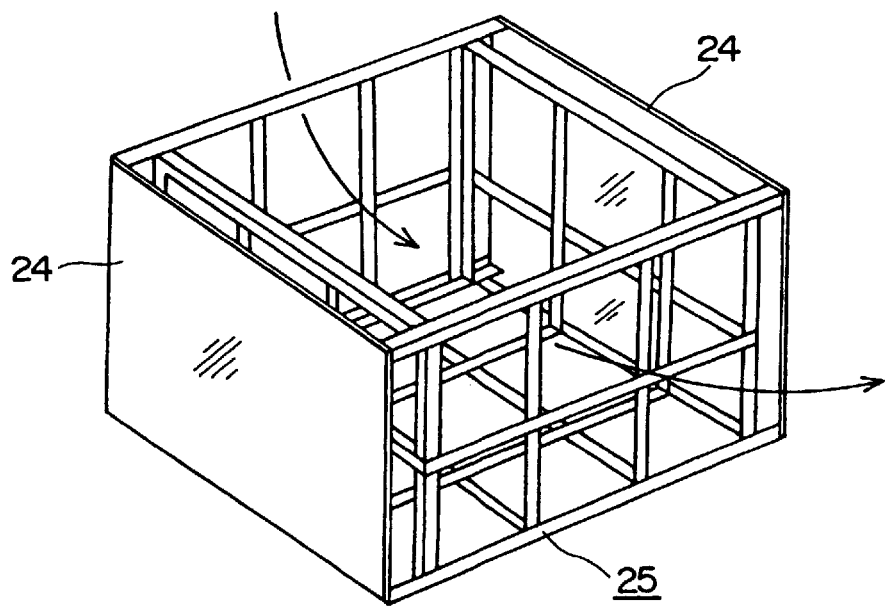
FIG. 8 is a perspective view showing an example of a tray for use in the continuous gas recirculating furnace.

FIG. 7 shows an embodiment in which the present invention is applied to a continuous gas recirculating furnace. The continuous gas recirculating furnace 1" is partitioned into zones 18a, 18b and 18c each of which can accommodate each tray 25 for carrying the heating target W, which corresponds to a unit quantity heated at a time, mounted thereon, and the heat source 3 and the out-of-furnace circulating path 4 such as shown in FIG. 1 or 2 are provided for each of the zones 18a, 18b and 18c. In this embodiment, partition walls 26 slightly protruding toward the inside of the furnace are provided to the boundaries between the respective zones 18a, 18b and 18c to substantially partition the trays 25 having the heating target W mounted thereon at the end portions of the trays 25. The tray 25 is constituted by a combined use of channel members in the form of grid so as not to interfere the flow of the gas current passing across the inside of the furnace in a direction orthogonal to the direction for carrying the heat target W. The partition plates 24 are provided on the front and rear surfaces (surfaces orthogonal to the direction for carrying the heating target). The partition plate 24 is formed of a material being capable of intercepting the radiant heat, e.g., aluminum, stainless, ceramics, steel and others. The partition wall 24 prevents radiation heat from being transferred between the heating targets W on the front and rear trays 25 so as to avoid the influence of the heating targets W adjacent to each other. The partition plate 24 also substantially partitions passages through which the gas current flows in accordance with the respective zones 18a, 18b and 18c and assures the gas current recirculation to maintain the independence of the zones.

Figure 9:
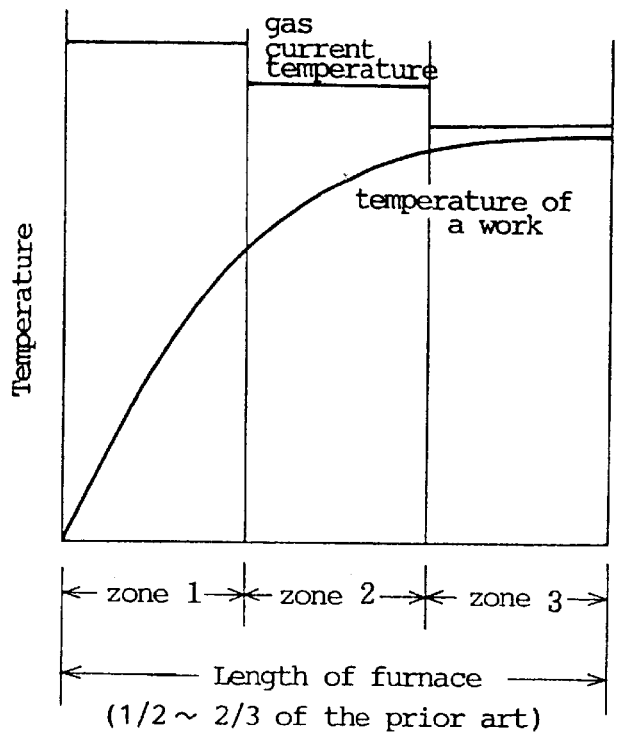
FIG. 9 is a view showing distribution of temperatures in the furnace according to the continuous gas recirculating furnace illustrated in FIG. 7.
Figure 10:
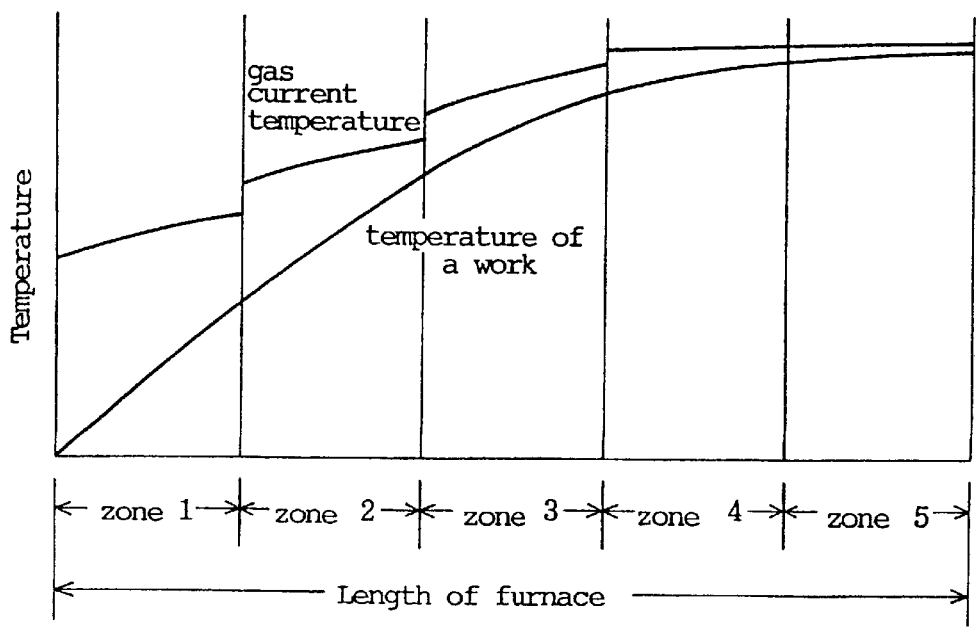
FIG. 10 is a view showing distribution of temperatures in the furnace according to a prior art continuous gas recirculating furnace illustrated in FIG. 12.
Figure 11:
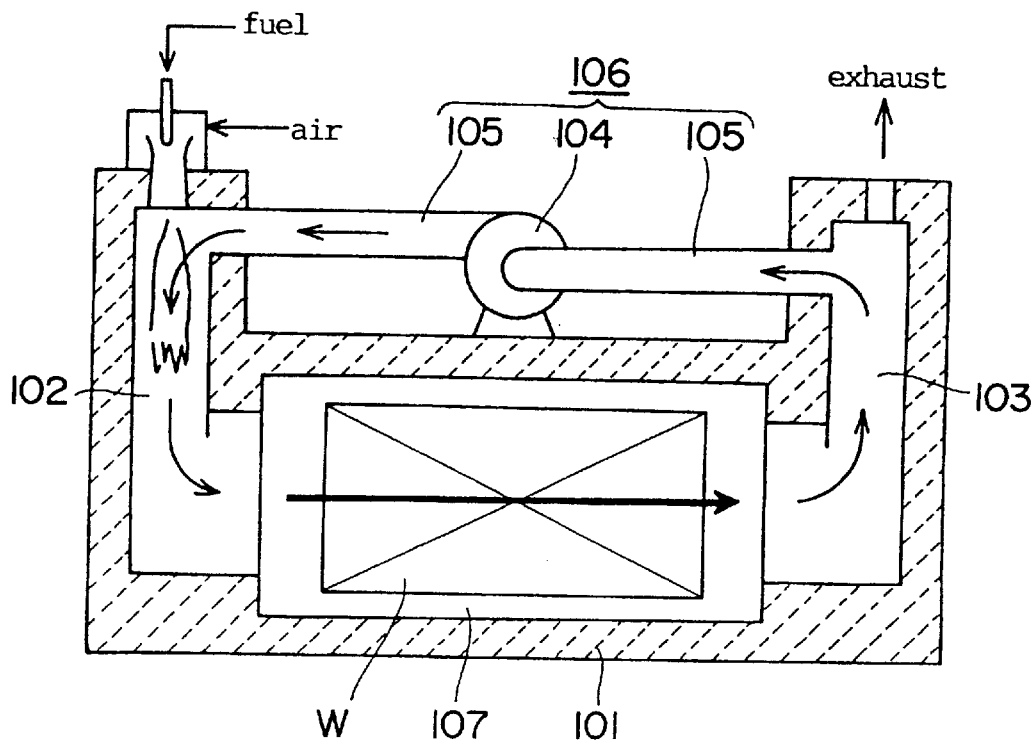
FIG. 11 is a principle view showing an example of a prior art gas recirculating furnace.
Figure 12:
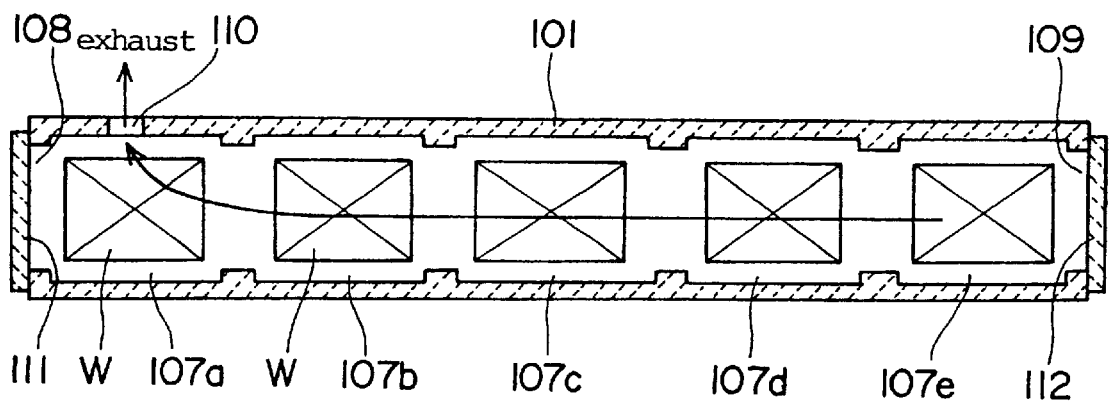
FIG. 12 is a principle view showing an example of a prior art continuous gas recirculating furnace.

On the other hand, although not shown, the heating chamber, the regenerative burner system as a heat source and the out-of-furnace circulating path are provided to each of the zones 18a, 18b and 18c, and increasing heat and accelerating the recirculating gas current are controlled in accordance with the respective zones 18a, 18b and 18c if necessary. Further, since the combustion gas generated due to an increase in heat in each of the zones 18a, 18b and 18c is subjected to heat recovery and then exhausted, the independence of the furnace temperature is maintained. Therefore, as shown in FIG. 9, the furnace temperature is controlled in such a manner that it is highest in a zone (zone 1) close to the heating target entry side which most requires heat and lowest in a zone (zone 3) close the heating target exit side. In this case, the heating target W can be rapidly heated to increase its temperature, which can reduce the length of the furnace to approximately ½ through ⅔ of that of the prior art. For example, in case of the conventional continuous gas recirculating furnace shown in FIG. 12, the length of the furnace corresponding to five zones can be reduced to that corresponding to three zones, and the heating target can be uniformly heated to the same temperature.

It is to be noted that, a material preheating equipment may be separately provided and the recirculating gas current may be led from each zone to the material preheating zone to remove heat from the gas current in the continuous gas recirculating furnace.

What is claimed is:

1. A gas recirculating furnace for leading a recirculating gas current heated by an out-of-furnace heat source into the furnace to heat a heating target, comprising: heating chambers which are provided on both side walls of the furnace and have heat sources to heat the recirculating gas current that is yet to be injected into the furnace; and an out-of-furnace circulating path for connecting the heating chambers to take out the recirculating gas current in the furnace to the outside of the furnace and flow it back into the furnace, the out-of-furnace circulating path including: regenerative beds provided in the vicinity of recirculating gas current inlet and outlet openings of the heating chambers, respectively; a circulating fan; a passage switching device for selectively and alternately connecting an intake side and a discharge side of the circulating fan to one of the regenerative beds to change a flow direction of the gas current to the regenerative beds; and a heat removing means for performing heat removal or dilution in order to change the gaseity of the recirculating gas current in a section between the both regenerative beds, thereby forming in the furnace a high-temperature strong recirculating current which inverts the flow direction of the gas current by periodical changeover of the passage switching apparatus.

2. The gas recirculating furnace according to claim 1, wherein the gas recirculating furnace is a continuous gas recirculating furnace in which a plurality of zones are partitioned in a direction along which the heating target is carried, the heating chamber and the out-of-furnace circulating path are provided in each zone, and the high-temperature strong recirculating current for periodically inverting the flow direction of the gas current is formed in each zone.

3. The gas recirculating furnace according to claim 2, wherein before and behind a tray for carrying the heating target are provided partition plates for intercepting radiation heat from the heating target on another tray in the forward direction and radiation heat to the heating target on still another tray in the rear direction.

4. The gas recirculating furnace according to claim 2, wherein the gas current temperature in a zone close to a heating target entry opening is higher than that in a zone close to the heating target exit opening.

5. The gas recirculating furnace according to claim 1 or 2, wherein the heat source is a regenerative burner system for alternately burning a pair of burners which have regenerative beds and perform supply of combustion air or exhaust of the recirculating gas current through the regenerative beds.

6. The gas recirculating furnace according to claim 1 or 2, wherein the heat removing means is provided between the passage switching device and the intake side of the circulating fan.

7. The gas recirculating furnace according to claim 1 or 2, wherein the heat removing means injects a small quantity of gas.

8. The gas recirculating furnace according to claim 1 or 2, wherein the heat removing means is a heat exchanger.

9. The gas recirculating furnace according to claim 1 or 2, wherein the heat removing means is a material preheating section and the material preheating section removes heat from the recirculating gas current.

10. The gas recirculating furnace according to claim 1 or 2, wherein the heat removing means is constituted by reducing the thickness of a heat insulating material of a passage between the regenerative beds.

\* \* \* \* \*